Figure 3:
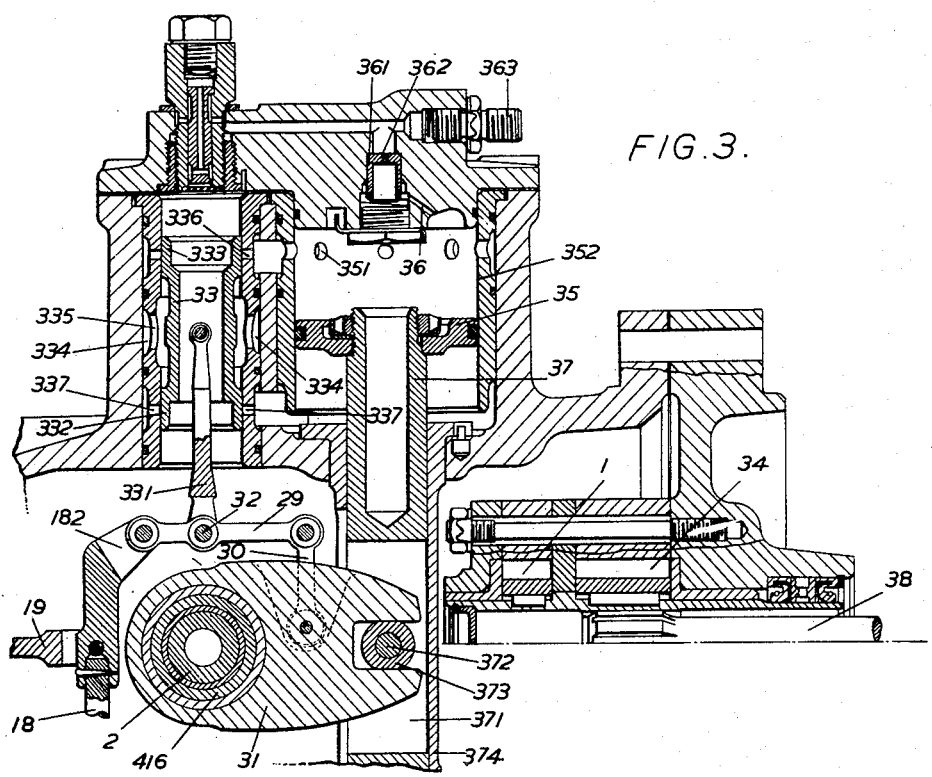

Oct. 19, 1954  G. H. MURRAY ET AL  2,692,132
HYDRAULIC GOVERNOR SYSTEM
Filed July 23, 1953  6 Sheets-Sheet 1
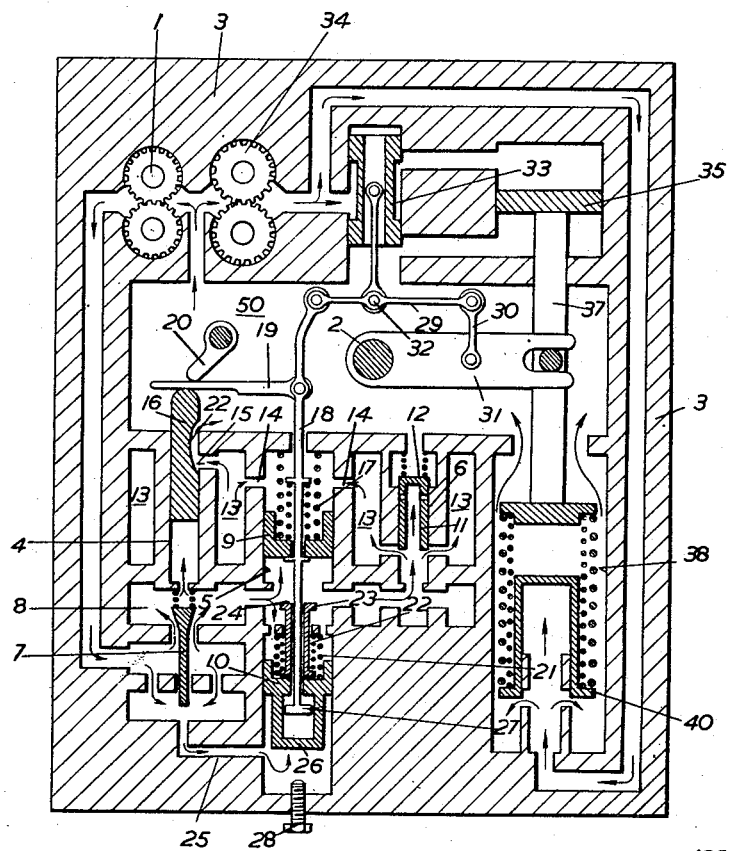
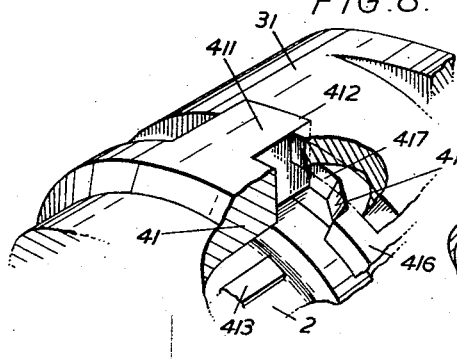 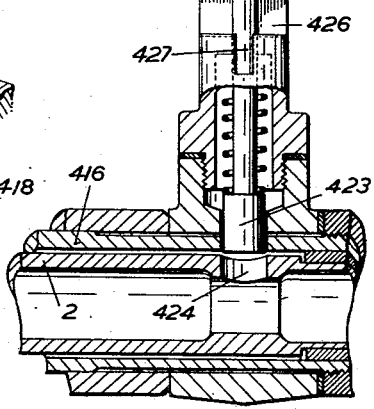
Inventors
George Hamilton Murray and
Peter Roy Smith
By Watson, Cole,
Grindle and Watson
Attorneys

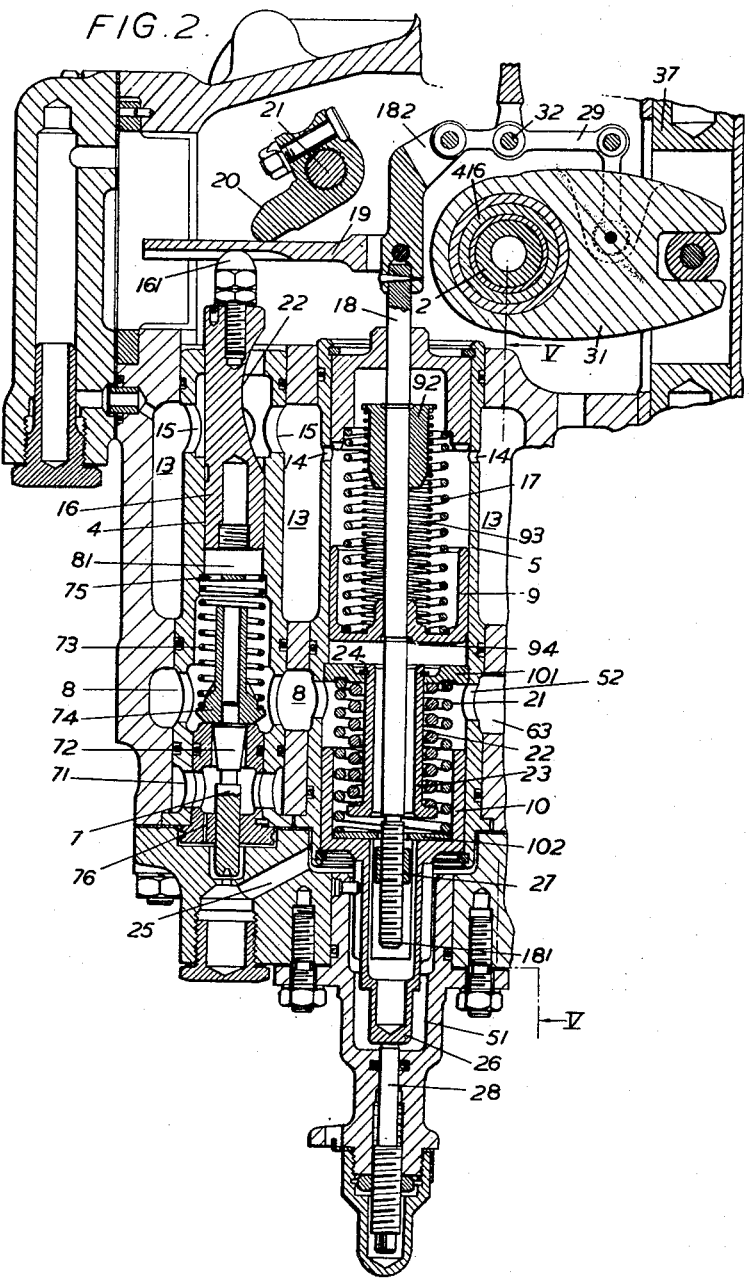

Oct. 19, 1954  G. H. MURRAY ET AL  2,692,132
HYDRAULIC GOVERNOR SYSTEM
Filed July 23, 1953  6 Sheets-Sheet 4
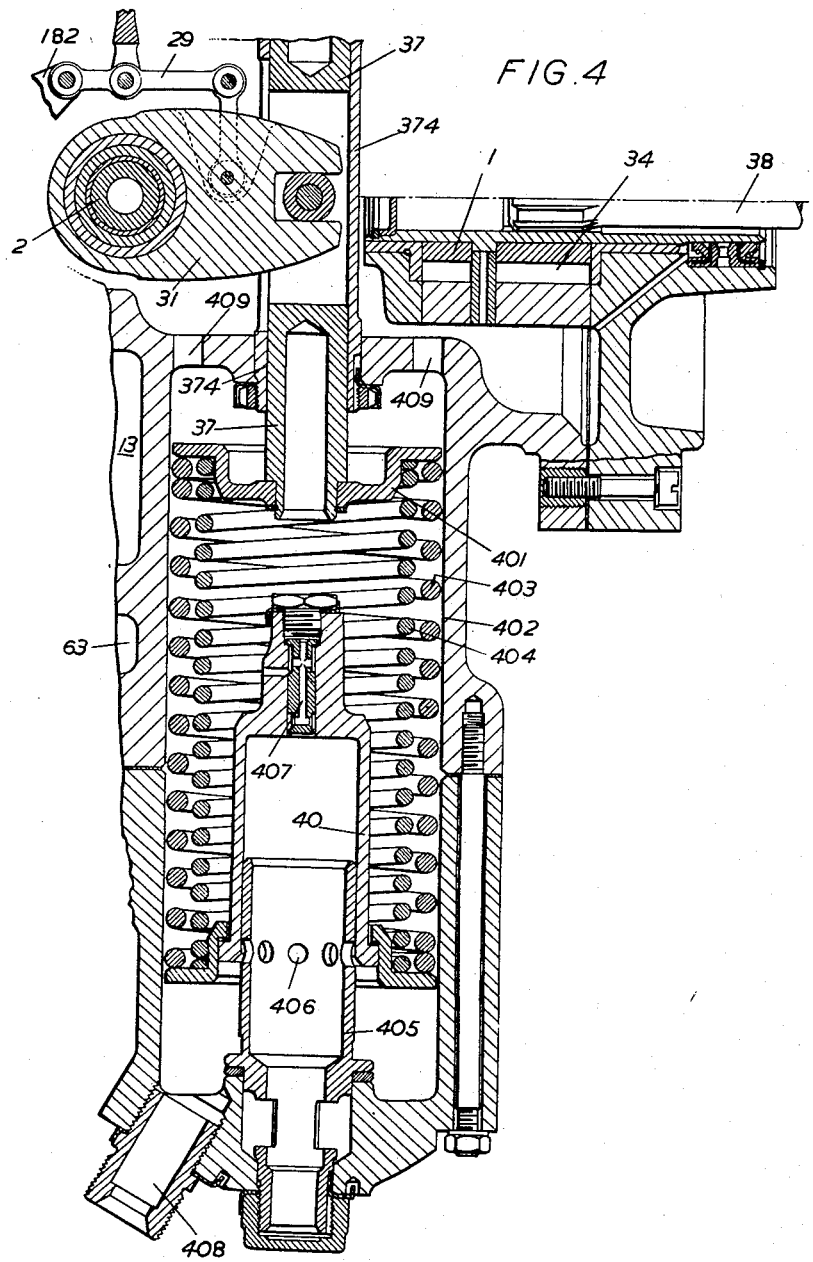
Inventors
George Hamilton Murray
and Peter Ray Smith
By Watson, Cole,
Grindle and Watson
Attorneys

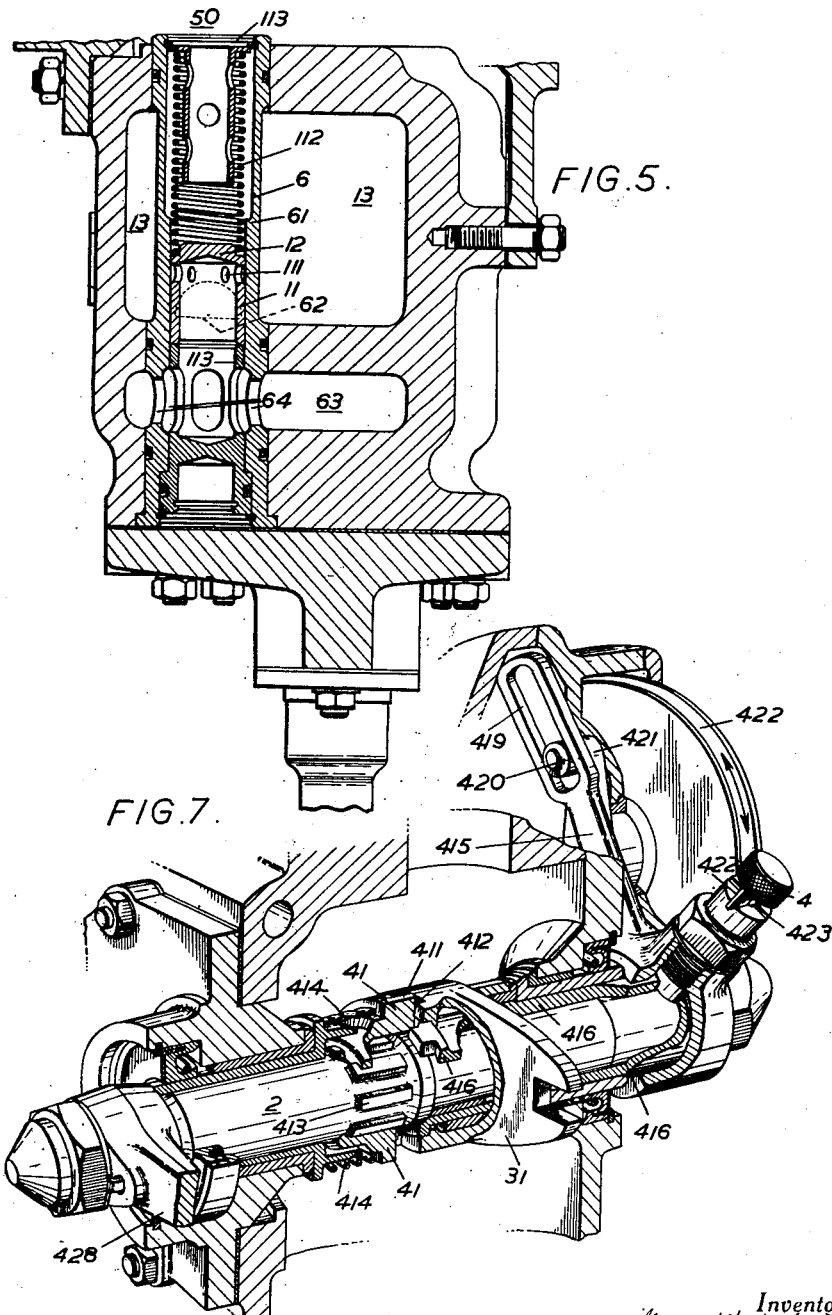

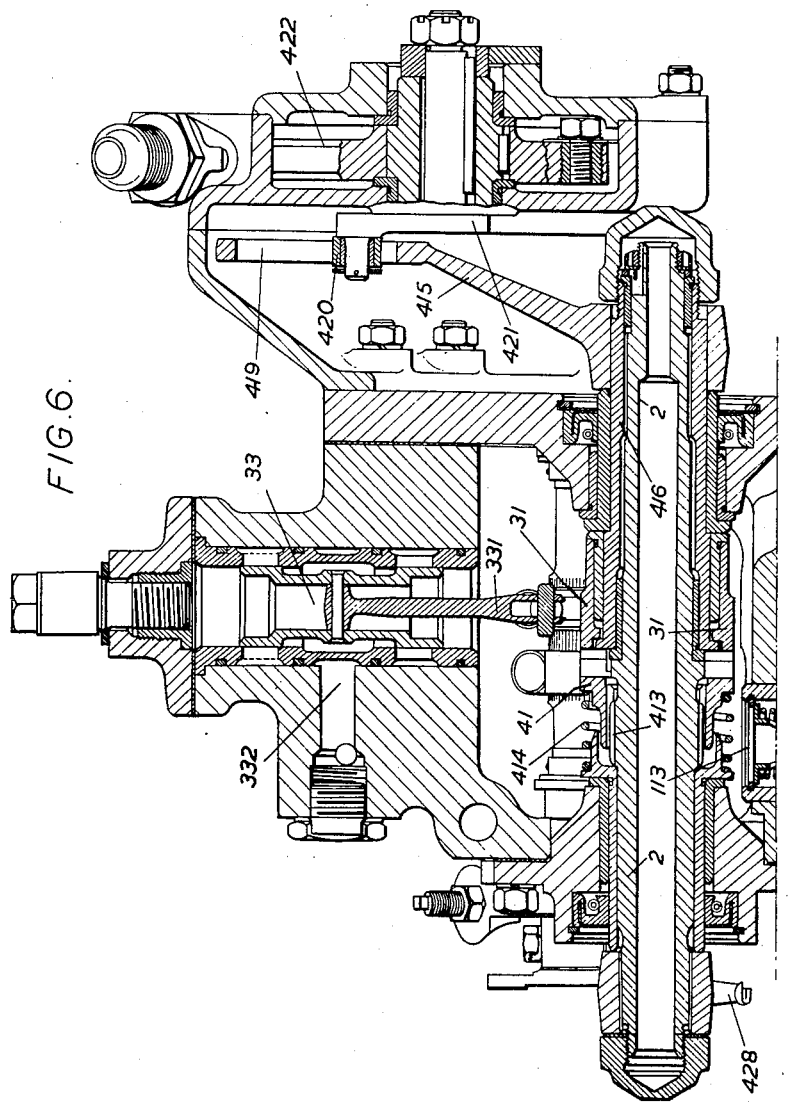

Patented Oct. 19, 1954

2,692,132

UNITED STATES PATENT OFFICE 2,692,132

HYDRAULIC GOVERNOR SYSTEM

George Hamilton Murray, Pinner, and Peter Roy Smith, Richmond, England, assignors to D. Napier & Son Limited, London, England, a British company Application July 23, 1953, Serial No. 369,849

Claims priority, application Great Britain July 28, 1952

11 Claims. (Cl. 264—14)

This invention relates to hydraulic governor systems, particularly for internal combustion engines, of the kind comprising a positive displacement pump driven at a speed proportional to the speed of the engine, a leak valve controlling the effective cross-section of the path by which fluid delivered by the pump can escape, a speed control member associated with the engine, for example with the fuel supply to the engine, to control the speed thereof, and hydraulic apparatus responsive to pressure changes due to changes in the rate of delivery of the pump arranged to actuate the speed control member.

In hydraulic governor systems of this general kind it has been found that the hydraulic apparatus responsive to changes in the rate of delivery of the pump tends to be over-sensitive, with the result that over-correction of the speed control member causes engine "hunting" or speed instability. It has already been proposed to provide a connection between the leak valve and the speed control member whereby movement of the speed control member caused by the hydraulic apparatus acts to open or close the leak valve and thus dampen, or to some extent counteract the movement imparted by the hydraulic apparatus, and so to stabilise the governor. It will be apparent that in any case by varying the setting of the leak valve it is possible to control the speed at which the engine is to operate.

It is an object of the present invention to provide an improved hydraulic governor system of the kind referred to, including such a leak valve, which will provide for limiting the range of movement of the speed control member, and thus the maximum amount of fuel which can be supplied to the engine, at any particular engine speed.

A hydraulic governor system according to the present invention comprises a displacement pump driven at a speed proportional to that of the engine, a working piston acting directly or indirectly on the speed control member of the engine, and acted upon by fluid pressure derived from the pump, a leak valve arranged in the hydraulic circuit of the piston to control escape of fluid therefrom and connected directly or indirectly with the working piston so as to be moved automatically in response to movements of the piston, means for adjusting the datum setting of the leak valve to control the speed at which the engine is to operate, and apparatus for preventing the supply of excess fuel to the engine at any setting of the governor apparatus, comprising a stop piston or the equivalent subject to a pressure dependent upon the engine speed, and means whereby such stop piston acts to resist or prevent movement of the speed control member in a direction to increase the fuel supply to the engine beyond a point which varies with and is determined by the engine speed.

Preferably the stop piston is subject to pressure derived from the displacement pump which supplies fluid to the hydraulic circuit of the working piston. Moreover the working piston is preferably doublesided, with the chamber on one side connected directly or indirectly to the delivery side of the displacement pump, while the chamber on the other side is connected to relief through the leak valve, and to the chamber on the first side through a spring-pressed release valve, whereby an increase in the flow from the pump is reflected as an increase in pressure on the second side of the working piston, relative to the pressure on the first side thereof.

According to a preferred feature of the invention the governor system includes a pressure reducing valve between the delivery side of the pump and the chamber on the first side of the working piston, the pressure reducing valve being so constructed that the pressure drop across the valve is approximately proportional to the flow through the valve, and thus to the speed of the engine, and in which the stop piston is double sided and its two sides are subject to the pressures respectively on the two sides of the pressure reducing valve. In such case the connection between the chamber on the first side of the working piston and the delivery side of the displacement pump is preferably by way of the pressure reducing valve.

Conveniently the working piston and the stop piston are arranged at opposite ends of a single cylinder, the pump pressure being admitted direct to the side of the stop piston remote from the working piston, while the low pressure side of the pressure reducing valve is connected to the intermediate part of the cylinder between the working piston and the stop piston, the side of the working piston remote from the stop piston being subject to the so called "working" pressure between the release valve and the leak valve.

According to another preferred feature of the invention the governor system includes a spring assembly arranged to act on the stop piston, such spring assembly comprising a first spring which is operative throughout the travel of the piston, and a second spring which is operative only at positions of the piston corresponding to relatively higher engine speeds.

The system may include a lost motion connection between the stop piston and the speed control member of the engine, and a resilient connection between the working piston and the speed control member of the engine, so that within the limits of the lost motion connection the speed control member is controlled by the working piston, whereas for movement of the working piston beyond these limits the resilient connection associated with the working piston is distorted, and the speed control member is controlled by the stop piston.

Preferably the governor system includes a manual operating control for the engine speed control member, and an override device which, on movement of the manual operating control through a predetermined distance towards the "off" or "stop" position, acts to disconnect the working piston from the speed control member. Moreover the system may include an emergency control device which acts to disconnect the working piston from the speed control member of the engine, and to connect the manual operating control thereto.

Thus in one form of the invention, the working piston is connected to the engine speed control through a dog clutch or similar device, one part of the clutch being urged by a spring or other means into engagement with the other part, and the manual operating control is connected to the engine sped control ethrough a lost-motion connection including cam or other means which are arranged on movement of the manual operating control sufficiently to take up the play in the lost motion connection in the direction to stop the engine, to disengage the two parts of the dog clutch against the force of the spring.

In this case it is preferred to include an emergency control device to locate the two relatively movable parts of the lost motion connection in the position in which the two parts of the dog clutch are disengaged, whereby the manual operating control becomes solely effective to control the engine speed control member.

The invention may be carried into practice in various ways but one specific embodiment of the invention as applied to a fuel-injection type internal combustion engine is shown by way of example in the accompanying drawings, in which Figure 1 is a sectional side elevation showing diagrammatically the arrangement which is shown in more detail in the remaining figures, Figure 2 is a sectional side elevation showing in detail part of the apparatus including the working piston acting on the speed control member of the engine the stop piston, the leak valve, and associated mechanism, Figure 3 is a sectional side elevation in the same plane as and partly overlapping Figure 2 showing the hydraulic servo mechanism through which the working piston acts on the speed control member of the engine, Figure 4 is a sectional side elevation in the same plane as, and partly overlapping Figures 2 and 3, and shows part of the pump by which the working fluid acting on the working piston is supplied and also the combined "booster" valve and return spring assembly for the servo piston of the hydraulic servo mechanism, Figure 5 is a cross-section on the line V—V in Figure 2, showing the release valve arranged between the high and low pressure chambers of the working piston, Figure 6 is a sectional elevation in the same plane as and partly overlapping Figure 5 showing special mechanism including a manual override control by which the speed control member is connected to the working piston, Figure 7 is a perspective view partly broken away of the mechanism shown in Figure 6 showing certain details of the arrangement shown therein, and Figures 8 and 9 are respectively an enlarged perspective view and an enlarged sectional view of details of the mechanism shown in Figures 6 and 7.

It is to be noted that Figures 2, 3 and 4 taken together represent a cross section in one plane of the complete hydraulic apparatus or system and that these figures overlap one another somewhat to make clear their relationships to one another.

The governing system illustrated will first be described in general terms by reference to the diagrammatic Figure 1, and then in greater detail with reference to the remaining figures of the drawings.

The governor system comprises a displacement pump 1 of the gear type driven directly or indirectly from the engine at a speed directly proportional to engine speed, and arranged to deliver hydraulic fluid to hydraulic control mechanism which is connected through a hydraulic servo device to the fuel control shaft 2 of the fuel injection pumps of the engine.

The hydraulic control mechanism is contained in a housing 3 having three parallel bores or chambers 4, 5 and 6, within and between which are provided the component valves, pistons, spring assemblies and hydraulic connections of the mechanism. Hydraulic fluid from the displacement pump 1 is admitted adjacent the lower end of the first (4) of the three chambers and passes through a spring-loaded pressure reducing valve 7 to a space 8 above the valve. The pressure reducing valve 7 is so constructed that the pressure drop across it is approximately proportional to the flow of fluid through it, and since the output of the pump 1 is approximately proportional to engine speed, and substantially the whole of the output passes through the valve, the pressure drop is therefore approximately proportional to engine speed. It will be noted however that the pressure drop is independent of the actual pressure level in the circuit. The pressure of the fluid on the downstream side of the valve 7 will be referred to hereafter for convenience as the "balance pressure," while the pressure on the upstream side of the valve will be called the "pump delivery pressure."

Having passed through the pressure reducing valve 7 the hydraulic fluid flows through a cross-drilling into a mid-portion of the second 5 of the three chambers, where the balance pressure acts on one side of a double-sided working piston 9 located in one half of the chamber and hereinafter assumed to be the upper half, and acts also on the adjacent or "upper" side of a double-sided stop piston 10 located in the lower half of the chamber. The fluid then passes through another cross-drilling into the lower part of the third chamber 6, which contains a spring loaded sleeve valve 11 arranged to uncover escape ports in an upper part of the third chamber, and actuated by a piston 12 (hereinafter called the release valve piston) sliding within the third chamber 6 and subject on its lower side to the balance pressure. The upper side of the release valve piston 12 is subject to fluid at "tank" pressure in the internal cavity 50 which pressure may be atmospheric, or may be maintained at a constant relatively low value. This spring loaded sleeve valve 11 therefore acts as a release valve to control the balance pressure.

After passing through the escape ports in the third chamber 6 the hydraulic fluid passes back through a cross drilling into a gallery 13 surrounding the upper part of the first and second chambers 4 and 5. The gallery 13 communicates through restricted orifices 14 with the upper part of the second chamber 5 where the pressure of the fluid which will hereafter be referred to as the "working pressure," acts upon the upper side of the double-sided working piston 9 and also through a further orifice 15 with the upper part of the first chamber 4 from which it escapes through an adjustable leak orifice, controlled by a leak valve 16 to the space 50 subject to tank pressure.

The upper side of the working piston 9 is acted upon by a compression spring 17 and the piston is connected through a spring-biased lost-motion device to a control rod 18 passing through a gland in the upper part of the second chamber 5, this control rod 18 being indirectly connected, as will be described below, through a hydraulic servo device, to the control shaft 2 of the fuel injection pumps of the engine. Pivotally connected to the control rod 18 is one end of a balance lever 19 an intermediate point in which bears against an eccentric or cam 20 controlled by a manual speed selection lever, while the other end of the balance lever 19 bears on the upper end of the leak valve 16. The leak valve 16 is formed as a solid cylindrical piston sliding in the upper part of the first chamber 4, the lower surface of the valve being subject to balance pressure which thus urges the valve upwards into contact with the end of the balance lever 19, while the circumferential surface of the valve is formed with a curved cut away portion 22, which permits hydraulic fluid at working pressure to escape from the gallery 13 and thus constitutes the variable leak orifice through which the fluid discharges to relief.

It will be seen that a momentary increase in fluid flow, caused by an increase in engine speed, will be reflected in an increase in working pressure, relative to balance pressure, which will tend to move the working piston 9 downwards and this in turn will tend to move the control rod 18 downwards. The control rod 18 also acts through the hydraulic servo device mentioned above to cause rotation of the fuel control shaft 2 in a direction to decrease the fuel supply to the engine. When the control rod 18 moves downwards however the balance lever 19 pivoting about the speed selection cam 20 allows the leak valve 16 to move upwards, and so permits an increase in the flow of hydraulic fluid from the gallery 13 to relief, which decreases the working pressure and so lessens any tendency of the apparatus to produce hunting conditions. Rotation of the cam 20 alters the fulcrum of the balance lever 19, and also adjusts the setting of the leak valve 16, thus simultaneously controlling the speed at which the engine is to be governed, and changing the law relating change in load to change in speed.

The stop piston 10, lying in the lower part of the second chamber 5 and subject on its upper side to balance pressure, is also loaded on its upper side by a double compression spring assembly, comprising a first spring 21 bearing at one end on a fixed annular seating in the chamber and arranged to be operative at its other end on the stop piston 10 throughout the travel of this piston, and a second spring 22 acting on a sliding sleeve 23, whose movement in a downward direction is limited by a stop member 24, so that the second spring 22 becomes operative on the stop piston 10 only when the piston moves upwards past a predetermined position. The lower side of the stop piston 10 is subject to the pressure of fluid on the high pressure side of the pressure reducing valve 7, that is to say to pump delivery pressure, by means of a fluid connection 25 between the lowest parts of the first and second chambers, 4 and 5, this fluid connection 25 including a restricted orifice to dampen any sudden movement of the stop piston. The stop piston is formed integral with a central downwardly projecting well 26 which is effectively closed at its upper end by an apertured plate or flange, upon which the compression spring 21 bears, and the lower part of the control rod 18 passes freely through this aperture.

The lower end of the control rod 18, where it extends downwards below the aperture in the plate or flange closing the well in the stop piston, is provided with an enlarged head 27, which prevents the end of the rod passing upwards through the aperture, and causes the control rod to be drawn or held downwards when the stop piston moves sufficiently downwards.

In normal operation the control rod 18 slides freely through the aperture in the stop position 10, and the biassing spring associated with the lost motion connection between the working piston 9 and the control rod 18 causes the control rod and working piston to move together as a single unit. If however the pump pressure, that is to say the engine speed, is such that the stop piston 10 takes up a position in which the head 27 of the control rod 18 engages the plate or flange closing the upper end of the well in the stop position 10 any further upward movement of the working piston 9 will act to compress the biassing spring in the lost motion device, and the control rod will not be moved upwards. The lower limit of the travel of the stop piston is limited by an adjustable stop member 28 mounted in the lower end of the second chamber 5. This arrangement provides an over-fuelling control to prevent excessive amounts of fuel being supplied to the engine at any speed.

The extreme upper end of the control rod 18 is pivotally connected through a linkage 29, 30 to a forked arm 31 connected for rotation with the control shaft 2 of the fuel injection pumps. An intermediate point 32 on this linkage is connected to the control valve 33 of the hydraulic servo device, which valve is arranged in known manner to direct hydraulic pressure fluid derived from a second displacement pump 34 mounted in the same casing with the pump 1 selectively to the chamber on either side of a double-sided servo piston 35 and to connect the other of said chambers to relief. The servo piston 35 is pivotally connected to the forked arm 31 on the control shaft 2 of the fuel injection pumps.

The upper end of the cylinder in which the servo piston 35 lines is provided with a permanent bleed 36 to relief (not shown in Figure 1, but shown in detail in Figure 3), and the lower side of the servo piston is connected to a return rod 37 extending downwards into an auxiliary chamber 38 containing a return spring assembly which acts in an upwards direction on the return rod 37 to bias the servo piston 35 towards its "idle" position corresponding to engine idling speed. The return spring assembly fulfills a double function and to this end also bears downwards on a so-called booster valve 40, which controls the flow of fluid from the second servo displacement pump 34 into the lower part of the auxiliary chamber 38 and thence either directly to relief or to the hydraulic fluid tank 50, whence it flows back to a reservoir. This hydraulic circuit constitutes the normal relief circuit for the hydraulic servo system.

The booster valve 40 includes an air bleed valve of known kind which will pass air but not oil (not shown in Fig. 1 but shown in detail in Fig. 4), and discharges through a restricted bleed orifice into the same auxiliary chamber, which is hydraulically connected to relief, or to tank pressure.

The hydraulic control mechanism described above with reference to the diagrammatic drawing of Figure 1, will now be described in greater detail by reference to Figures 2, 3 and 4, and 5 in which parts shown diagrammatically in Figure 1 are given the same reference numerals for ease of understanding, while subsidiary parts associated therewith are given numeral suffixes (for example the part 71 is associated with the part 7).

One pinion, the driven pinion, of the positive displacement gear pump 1 is shown in half section in Figures 3 and 4. The driven pinion is connected for rotation with the shaft 38 which is driven from the engine crankshaft at a speed proportional to engine speed. One pinion of the second displacement pump 34, which is also driven from the same shaft 38, is also shown in half-section in Figures 3 and 4.

Referring first to Figure 2, hydraulic fluid under pressure is supplied from the gear pump 1 through a conduit (not shown) to the lower most annular chamber 71 adjacent the pressure reducing valve 7. The valve 7 comprises a frustoconical element 72 lying at least partly within a cylindrical bore in the chamber 4, and a spring assembly including a spring 73 and an end cap 74, the upper end of the spring 73 being arranged to bear against an abutment plate 75 located in a shoulder formed in the chamber 4. In operation the valve 7 lifts against the pressure of the spring 73 and pressure fluid passes around the conical element 72 into the annular chamber 8, and thence to the space 81 below the leak valve 16. As mentioned, the characteristics of the valve are so designed that the pressure drop across the valve is proportional to the fluid flow through the valve.

The annular chamber 8 communicates with the centre part of the second chamber 5, and the hydraulic fluid at "balance pressure" exerts an upward force on the lower side of the working piston 9. The working piston 9 is urged downwardly by a spring 17 abutting against a fixed shoulder in the upper part of the chamber 5, and the piston is connected to the control rod 18 by a spring-biassed lost-motion connection including a collar or spring seating 92 secured to the rod, and a compression spring 93 which bears at one end on the collar 92 and at the other end on the piston 9 and urges the piston downwards relative to the rod against an abutment 94 secured to the rod below the piston.

The stop piston 10 is arranged in the lower part of the second chamber 5, and is formed integral with the well 26 which lies in a subsidiary chamber 51 below the chamber 5, the downward limit of movement of the piston 10 thus being determined by the position of the adjustable stop 28 which abuts against the lower end of the well 26. Fluid from the annular chamber 71 is admitted to the lower side of the stop piston through the restricted orifice 76 and the passage 25.

The stop piston 10 is downwardly biassed by a spring assembly including a compression spring 21 acting between a fixed annular abutment 101 arranged in the valve chamber 5 above the piston 10, and an apertured plate 102 resting on an internal shoulder formed in the piston 10 above the well 26. The spring assembly also includes a second compression spring 22 acting between the annular abutment 101 and a flange at the lower end of a sliding sleeve 23, the sleeve 23 having an enlarged radial flange 24 formed at its upper end which engages the fixed abutment 101 to limit the downward movement of the sleeve. The bore of the sleeve 23 is considerably larger than the diameter of the control rod 18, and thus pressure fluid is permitted to pass freely from the annular chamber 8 to the space below the working piston 9.

The lower end 181 of the control rod 18, which passes freely through the apertured plate 102 in the stop piston 10, is screw threaded to receive an adjustable head 27, which is larger than the aperture in the plate 102. As described above, movement of the control rod in an upward direction is limited by the engagement of the head 27 with the plate 102 on the stop piston, and the relative strength of the springs 17, 93, 21, and 22, is so designed that, on such engagement, the springs 17 and 93 are distorted to allow the working piston to move relatively to the control rod, while the control rod itself is located by the position of the stop piston.

The upper end of the control rod 18 is pivotally connected to the balance lever 19, and is rigidly secured to an extension 182, which acts through the hydraulic follow-up servo mechanism (shown in greater detail in Figure 3) to control the movement of the forked arm 31 and thus of the shaft 2 controlling the supply of fuel to the engine. The remote end of the balance lever 19 is formed with a groove on its under side which bears against the domed head 161 attached to the upper end of the leak valve 16. An intermediate point in the upper surface of the balance lever 19 bears against the speed selection cam 20 which is mounted for rotation on a shaft 21 extending outside the apparatus and connected to an operator's manual speed selection lever (not shown).

The release valve 11, which is shown diagrammatically in Figure 1 as lying in the same general plane with the valve chambers 4 and 5, is in the practical embodiment for convenience and compactness arranged in a plane normal thereto and is illustrated in detail in Figure 5. Pressure fluid at "balance" pressure from the lower side of the working piston 9 passes through the ports 52 (see Figure 2) into the space 63 adjacent to the lower end of the valve chamber 6 and thence through the ports 64 (see Fig. 5) into the interior of the release valve 11. The valve 11 is of the sleeve type and is arranged to slide in a cylinder 61 defining the valve chamber 6. The valve 11 is formed integral with a piston 12 closing its upper end and the lower end of the valve cooperates with one or more ports (shown in dotted lines at 62) to permit pressure fluid to pass into the gallery 13 surrounding the valve chamber. The valve 11 is spring loaded in a downward direction by a spring 112 abutting against a fixed plug 113 at the upper end of the chamber 6 and the plug 113 is provided with an aperture through which the space above piston 12 communicates with the internal cavity 50 which is subject to tank pressure. Downward movement of the valve 11 is limited by the fixed tubular member 113, and in this lowest position the flow of pressure fluid through the port 62 is shut off. The valve in normal operation thus acts as a pressure release valve, the valve piston 12 being subject to the difference between the balance pressure and tank pressure (or relief as the case may be).

The valve 11 is also arranged to act as a relief or safety valve for this part of the hydraulic circuit and to this end the upper part of the valve sleeve is provided with a series of circumferentially spaced ports 111, which permit pressure fluid to pass into the chamber on the upper side of the valve when the valve rises beyond a predetermined point.

The hydraulic follow-up servo mechanism arranged between the control rod 18 and the control shaft 2 associated with the fuel injection pumps is shown in detail in Figure 3. The extension 182 on the upper end of the control rod 18 is pivotally connected to the lever 29 which is in turn connected through the link 30 to the forked-arm 31. An intermediate point 32 in the length of the lever 29 is connected through the link 331 to a balanced piston-type control valve 33 having piston formations 332, 333 at opposite ends. Pressure fluid from the displacement pump 34 is admitted through a fluid conduit (not shown) to an annular chamber 334 which communicates through ports 335 with the annular space between the two piston extremities of the valve 33. Ports 336 adjacent to the upper end of the valve 33 communicate through ports 351 with the interior of the upper end of the chamber 352 within which is mounted a double-sided servo piston 35. Similarly ports 337 adjacent to the lower end of the valve 33 communicate with the lower end of the chamber 352 below the servo piston 35. The valve 33 thus acts as a reversing control valve selectively to connect one side of the servo piston 35 to pressure and the other side to relief.

The upper end of the chamber 352 is provided with a permanent bleed 36 to relief, including a plug 361 screwed into the upper end of the cylinder and having a restricted aperture 362 which communicates with a screwthreaded nipple 363 through which a steady flow of hydraulic fluid is discharged even when the servo piston 35 is stationary.

The servo piston 35 is rigidly connected to a return rod 37 which passes through a gland in the lower end of the chamber 352 and is formed with a longitudinal diametral slot 371 transfixed by a pin 372 supporting a flattened bushing 373 which is an accurate sliding fit in the forked part of the forked arm 31. Movements of the control rod 18 thus act initially to move the control valve 33 so as to introduce pressure fluid to one side or other of the servo piston 35, which in turn provides power assisted operation of the control shaft 2. The consequent movement of the forked arm 31 acts through the follow-up linkage 29 and 30 to close the control valve 33 until such time as further movement of the control rod 18 causes this valve to open again.

The combined booster valve and return spring assembly for the return rod 37 is shown in detail in Figure 4. The lower end of the return rod 37 is a sliding fit in a sleeve 374 extending through the upper wall of the cylinder 402, and is provided with a spring seating 401 to receive the upper ends of two helical compression springs 403 and 404. The lower ends of the springs 403, 404 rest on a flange-like seating secured to the sleeve-type "booster" valve 40, which is a sliding fit on an internal tubular valve member 405 formed with circumferentially spaced valve ports 406. Pressure fluid from the pump 38 is supplied throgh a hydraulic connection (not shown in Figure 4) to the lower end of the tubular valve member 405 and exerts an upward thrust on the closed upper wall of the valve 40 to open the ports 406 against the action of the springs 403, 404. The upper wall of the valve 40 is provided with a restricted air bleed comprising a plug formed with a small drilling or restricted aperture 407 designed to pass air only. Having passed through the ports 406 the hydraulic fluid which may be at a relatively high temperature due to the dissipation of energy when passing through the ports is returned to the hydraulic reservoir through the connection 408.

A manual operating control assembly is provided in association with the control shaft of the fuel injection pumps to enable an operator to over-ride the governor for starting or stopping purposes for example, or in the event of a governor failure. The assembly is shown in detail in Figures 6, 7, 8 and 9. The control shaft 2 of the fuel injection pumps of the engine is connected to the forked arm 31 under the control of the governor, through a dog clutch, comprising a dog sleeve 41 splined to the shaft 2 and having one or more axially extending dogs 411 (see Figure 8) arranged to engage with recesses 412 between cooperating dogs in the forked arm 31, the dog sleeve 41 being axially slidable on splines 413 provided on the shaft 2, and being urged into the engaged position by a spring 414 surrounding the shaft. A manual operating control lever 415 is rigidly mounted on an over-ride sleeve 416 surrounding the shaft 2 on the side of the forked arm 31 remote from the dog clutch, this over-ride sleeve 416 extending within the forked arm and being formed at its end adjacent the dog sleeve 41 with one or more circumferential recesses 417 of approximately 50° arcuate length, arranged to cooperate with the dogs 411. Each of these recesses 417 is formed with a flat side at one end, and an inclined portion 418 sloping axially outwards to half the depth of the recess at the other end. Movement of the manual operating lever 415 in a direction to reduce the fuel supply to the engine will eventually cause the dogs 411 on the dog sleeve 41 to ride up the inclined portions 418 of the recesses 417 on the over-ride sleeve 416 and thus will disengage the dog sleeve 41 from the recesses 412 in the governor controlled forked arm 31. Further movement of the manual operating control lever 415 in the same direction will then cause the dog sleeve 41 and thus the control shaft 2, to rotate and so stop the engine. Conveniently the manual operating control lever 415 is provided with a roller 420 on a slot 419 cooperating with a crank arm 421 connected for rotation with a pulley 422, which is mounted eccentrically in relation to the shaft 2, and which may be operated remotely by means of a belt or wire from a further pulley (not shown) under the control of the operator. The shaft 2 is secured to an output arm 428 which is arranged to operate the engine fuel pumps.

An additional emergency control is provided to enable an operator to over-ride the governor entirely. For this purpose the manual operating control lever 415 is provided with a releasable spring-pressed plunger 423 (see Figure 9) which is arranged to pass through a locating bore in the over-ride sleeve 416 into a locating recess 424 in the control shaft 2. To operate the emergency control the operator releases the plunger by rotating the head 425 until the webs 426 engage the slots 427, and rotates the control lever 415 in a direction to reduce the fuel supply until the over-ride sleeve 416 causes the dog sleeve 41 to become disengaged from the forked arm 31. In this position the plunger 423 passes through the locating recesses, and the control lever 415 is thus locked to the control shaft 2 for manual control, while the forked arm 31 and thus the governor, is held out of engagement.

This arrangement also provides for easy re-engagement of the governor when desired.

What I claim as my invention and desire to secure by letters Patent is:

1. Hydraulic governor apparatus for an internal combustion engine comprising a displacement pump driven at speed proportional to that of the engine, a speed control member arranged to control the speed of the engine, a working piston associated with the speed control member and acted upon by pressure derived from the pump, a leak valve arranged in the hydraulic circuit of the working piston to control the escape of fluid from the said circuit, the said leak valve being connected with the working piston so as to be moved automatically in response to movements of the piston to dampen the movements of the piston, means for adjusting the datum setting of the leak valve to control the speed at which the engine is to operate, and apparatus to limit the supply of fuel to the engine at any particular engine speed comprising a movable hydraulic stop, and means for varying the position of the said stop in accordance with engine speed, the said stop being arranged to resist movement of the speed control member, in a direction to increase the speed, beyond a point which thus varies with and is determined by the engine speed.

2. Hydraulic governor apparatus as claimed in claim 1 in which the movable stop comprises an hydraulic stop piston, which is subject on one side to hydraulic pressure derived from the said displacement pump.

3. Hydraulic governor apparatus as claimed in claim 1 in which the working piston is double-sided with the chamber of one side connected to the delivery side of the displacement pump while the chamber on the other side is connected to relief through the said leak valve, and including a spring urged release valve arranged in a hydraulic connection between the two chambers, whereby an increase in the fluid flow from the displacement pump is reflected as an increase in pressure on the low pressure side of the working piston relative to the pressure on the high pressure side thereof.

4. Hydraulic governor apparatus as claimed in claim 3, including a pressure reducing valve arranged in the hydraulic connection between the delivery side of the pump and the working piston, the said pressure reducing valve being so constructed that the pressure drop across the valve is substantially proportional to the flow through the valve, and thus to engine speed, and in which the hydraulic stop comprises a double-sided hydraulic piston, the two sides of the piston being subject respectively to the pressures on the two sides of the pressure reducing valve.

5. Hydraulic governor apparatus as claimed in claim 4, in which the working piston and the hydraulic stop piston are arranged at opposite ends of a single cylinder, the pump delivery pressure being admitted direct to the side of the stop piston remote from the working piston, while the low pressure side of the pressure reducing valve is connected to the intermediate part of the single cylinder between the working piston and the stop piston, the side of the working piston remote from the stop piston being subject to the so-called working pressure between the release valve and the leak valve.

6. Hydraulic governor apparatus as claimed in claim 5, including a lost motion connection between the hydraulic stop piston and the speed control member of the engine, and a resilient connection between the working piston and the speed control member of the engine, such that within the limits of the lost motion connection the speed control member is controlled by the working piston, whereas for movement of the working piston beyond such limits the resilient connection is distorted, and the speed control member is controlled by the stop piston.

7. Hydraulic governor apparatus as claimed in claim 6, including a spring assembly arranged to act on the stop piston, said spring assembly comprising a first spring which is operative throughout the travel of the stop piston, and a second spring which is operative only at positions of the stop piston corresponding to relatively high engine speeds.

8. Hydraulic governor apparatus as claimed in claim 1, including a lost motion connection between the hydraulic stop and the speed control member of the engine, and a resilient connection between the working piston and the speed control member of the engine, such that within the limits of the lost motion connection the speed control member is controlled by the working piston, whereas for movement of the working piston beyond such limits the resilient connection is distorted, and the speed control member is controlled by the stop piston.

9. Hydraulic governor apparatus as claimed in claim 1, including a manual operating control connected to the engine speed control member, and an over-ride mechanism which, on movement of the manual operating control through a predetermined distance towards its "stop" position, acts to disconnect the working piston from the engine speed control member, so that further movement of the manual operating control towards its "stop" position acts to reduce the engine speed.

10. Hydraulic governor apparatus as claimed in claim 9, including a clutch between the working piston and the engine speed control member, resilient means tending to urge the parts of said clutch into engagement, a lost-motion connection between said manual operating control and said engine speed control member, and means acting to disengage said clutch in response to predetermined movement in said lost-motion connection.

11. Hydraulic governor apparatus as claimed in claim 10, including an emergency control device arranged to lock the two parts of said lost-motion connection in a position in which said clutch is disengaged, whereby the governor working piston is disconnected, and the manual operating control becomes solely effective to control the engine speed control member.

References Cited in the file of this patent

UNITED STATES PATENTS

| Number | Name | Date |
|---|---|---|
| 2,481,334 | Nicolls | Sept. 6, 1949 |